Patented June 5, 1923.

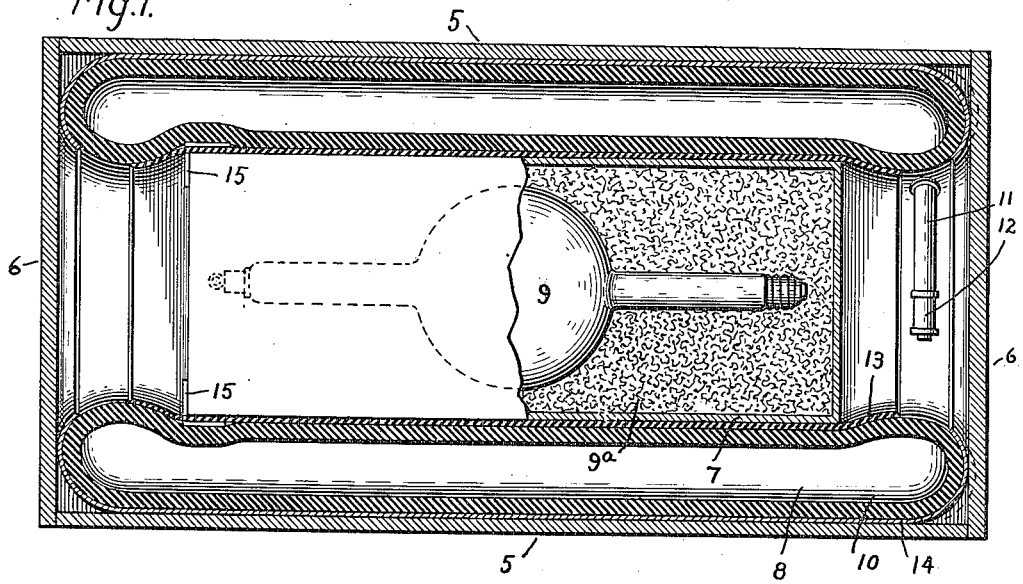
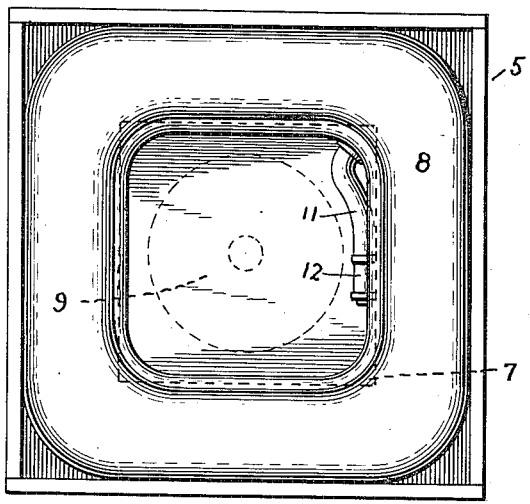
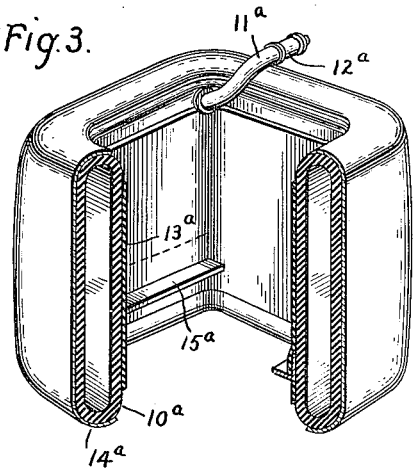

1,457,496

UNITED STATES PATENT OFFICE.

HENRY E. BUTLER, OF SCHENECTADY, NEW YORK.

PACKING RECEPTACLE.

Application filed December 27, 1920. Serial No. 433,085.

*To all whom it may concern:*

Be it known that I, HENRY E. BUTLER, a citizen of the United States, residing at Schenectady, in the county of Schenectady, State of New York, have invented certain new and useful Improvements in Packing Receptacles, of which the following is a specification.

The present invention relates to packing receptacles and has for its object to provide an improved structure and arrangement of packing receptacle particularly intended for use in shipping fragile articles such as glassware and the like.

For a consideration of what I believe to be novel and my invention, attention is directed to the accompanying description and the claims appended thereto.

In the drawing, Fig. 1 is a longitudinal sectional view of a packing receptacle embodying my invention; Fig. 2 is an end view thereof with the end wall of the outside casing removed; and Fig. 3 is a perspective view partly broken away of a pneumatic lining or cushion used in carrying out my invention.

According to my invention I provide an outer casing and an inner casing, the inner casing being the immediate container for the fragile article to be shipped, and between the two casings I interpose a pneumatic lining or cushion which is preferably made of rubber and is inflated so as to firmly hold the inner casing in spaced relation to the outer casing. By this means the fragile article is completely protected as the air cushion absorbs all shocks and blows received by the outer casing and prevents them from being transmitted to the inner casing.

Referring to the drawing, Figs. 1 and 2, I have illustrated an embodiment of my invention comprising a rectangular outer casing having side walls 5 and end walls 6, a rectangular inner casing 7, and a pneumatic cushion or lining 8.

The outer casing may be made of wood, corrugated paper board, or other suitable material, and one of the ends or sides serves as the cover which is put on or closed after the article or articles to be shipped are in place. In the present instance the right hand end 6 is the cover. The inner casing 7 may likewise be made of any suitable material, and in the present instance it is shown as containing an X-ray tube 9 which is the fragile article to be shipped. The X-ray tube is shown as having a suitable material $9^a$, such as excelsior, packed around it to hold it against movement in casing 7.

The pneumatic cushion or lining 8 comprises a double walled envelope 10, preferably made of rubber and provided with a tube 11 having a valve 12 in its end which may be of the same type as an ordinary pneumatic tire valve. On the inside and outside of the envelope are fabric wear chafing strips 13 and 14 provided to protect the rubber from wear. Inside the envelope 8 and adjacent what may be termed its lower end, are stops in the form of shelves 15, which project inward and form seats for inner casing 7. Shelves 15 may be formed of hard rubber, fiber, metal, or equivalent material, and in the present instance they are shown as comprising strips angular in cross section and having one side attached to the double walled envelope.

In packing an article to be shipped, the inner casing 7 containing the article is inserted inside the cushion or lining 8 until it strikes the stops at the lower end of the cushion. At this time the cushion is wholly or partially deflated and it is of such size that when deflated the inner casing will slip inside it with a snug fit. Also it is sufficiently long so it projects beyond the inner casing at both ends. After the inner casing has been inserted inside the cushion, both are then inserted into the outer casing. The outer casing is larger than the inner casing as to all dimensions, but is slightly shorter in length than cushion 8. The cushion 8 is now inflated by means of a suitable pump or from a source of compressed air supply until its walls are forced into firm engagement with the inner surface of the outer casing and the outer surface of the inner casing. When so inflated the end of the cushion projects somewhat beyond the open end of the outer casing, as indicated in dotted lines at the right hand end of Fig. 1 which is taken as having been the open end through which the cushion and inner casing were inserted into the outer casing. Now, when the cover is fastened into place it compresses the two ends of the cushion forcing them to lie or bulge over the ends of inner casing 7, as shown in Figs. 1 and 2. This serves to firmly hold the inner casing from longitudinal movement and as is obvious, it cannot move sidewise. The pneumatic cushion or lining thus acts to hold the inner casing in spaced relation to the outer casing and to absorb all shocks received by the outer casing and prevent their transmission to the inner casing.

The wear strips or chafing strips 13 and 14 are preferably made of strong durable fabric so as to protect the envelope 10 from being rubbed through by the casings.

It will be noted that the cushion or lining 8 is a separate part and it may be used over and over. To unpack the receptacle the cover is removed and the cushion deflated, after which the cushion is removed from the outer casing and the inner casing from the cushion. The cushion may be then returned to the shipper for use again. The outer casing or both the outer and inner casings may be returned also if found desirable. Usually, however, it will be found profitable to return only the cushion. As the cushions will be returned to the shipper in a deflated condition their bulk will be relatively small and a large number can be packed in a small container.

By my invention I provide a packing receptacle which gives the maximum degree of protection to the fragile article being shipped and reduces breakage to a minimum. At the same time the cost of the receptacle is not excessive or prohibitive to its use. And, in fact, when the items of breakage and high transportation rates are taken into consideration, my improved packing receptacle compares more than favorably with packing receptacles now in common use. Another advantage of my improved construction resides in the fact that smaller outside containers than those commonly in use for a given article may be employed. This results in a saving, first, in the cost of the container, and second, in the cost of transportation. By reason of the superior packing I am also able to obtain the most favorable transportation rates.

It will be understood of course that my packing receptacle may be made in various shapes and sizes according to the requirements of any particular case. In Fig. 3 I have shown a perspective view partly broken away of a lining or cushion of different size from that shown in Figs. 1 and 2. It is in all essentials the same, however, and the same reference numerals with the exponent *a* added have been applied to corresponding parts.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A packing receptacle for fragile articles comprising a double walled envelope open at one end to receive a fragile article, the inner wall of said envelope being formed of rubber and adapted to extend beyond the end of the article whereby when the envelope is inflated it will bulge over the end of the article to hold it against movement.

2. A packing receptacle for fragile articles comprising a double walled envelope open at one end to receive a fragile article, the inner wall of said envelope being formed of rubber and adapted to extend beyond the article at both ends whereby when the envelope is inflated it will bulge over the ends of the article to hold it against movement.

3. In a packing receptacle for fragile articles, a casing, and a separate pneumatic lining in the form of a double walled envelope which is adapted to receive the article to be shipped, and then be inserted into said casing and inflated, said lining being of greater length than the casing, whereby it will bulge over the ends of the article to hold it from movement.

4. In a packing receptacle for fragile articles, an outer casing, an inner casing containing the fragile article to be shipped, said inner casing being smaller as to all dimensions than the outer casing, and a pneumatic envelope located between the two casings, which envelope surrounds the inner casing on four sides and bulges over its two ends.

5. In a packing receptacle for fragile articles, an outer casing, an inner casing containing the fragile article to be shipped, said inner casing being smaller as to all dimensions than the outer casing, and a pneumatic envelope located between the two casings, which envelope surrounds the inner casing on four sides and bulges over its two ends, said envelope having stop means adjacent one end.

6. As an article of manufacture, a pneumatic lining member comprising a continuous double walled envelope, a valved inflating tube and a stop means within the envelope and adjacent one end.

In witness whereof, I have hereunto set my hand this 23rd day of December, 1920.

HENRY E. BUTLER.